United States Patent [19]

Kida et al.

[11] Patent Number: 4,668,643

[45] Date of Patent: May 26, 1987

[54] ZRB₂ COMPOSITE SINTERED MATERIAL

[75] Inventors: Otojiro Kida; Yutaka Segawa, both of Yokohama, Japan

[73] Assignee: Asahi Glass Company, Ltd., Tokyo, Japan

[21] Appl. No.: 749,829

[22] Filed: Jun. 28, 1985

[30] Foreign Application Priority Data

Jul. 10, 1984 [JP] Japan .................................. 59-141400
Aug. 14, 1984 [JP] Japan .................................. 59-168812
Sep. 14, 1984 [JP] Japan .................................. 59-191815

[51] Int. Cl.⁴ ........................ C04B 35/56; C04B 35/58
[52] U.S. Cl. ......................................... 501/92; 501/96
[58] Field of Search ................................... 501/92, 96

[56] References Cited

U.S. PATENT DOCUMENTS 3,775,137  11/1973  Clougherty et al. ................. 501/92
4,029,000   6/1977  Nakamura et al. ................... 501/96
4,199,480   4/1980  Parent et al. ......................... 501/96
4,233,077  11/1980  Hazel ................................... 501/96
4,379,852   4/1983  Watanabe et al. .................... 501/92

*Primary Examiner*—William R. Dixon, Jr.
*Assistant Examiner*—Steven Capella
*Attorney, Agent, or Firm*—Oblon, Fisher, Spivak, McClelland, & Maier

[57] ABSTRACT

A $ZrB_2$ composite sintered material consisting essentially of at least 1% by weight of SiC, at least 1% by weight of BN, at most 20% by weight of AlN, at most 20% by weight of $B_4C$, the rest being substantially $ZrB_2$, provided that the total amount of SiC and BN is from 2 to 50% by weight.

8 Claims, No Drawings

ZRB₂ COMPOSITE SINTERED MATERIAL

The present invention relates to a $ZrB_2$ (zirconium diboride) composite sintered material.

In general, metal boride ceramics are characterized by a high melting point, high hardness, high strength and high corrosion resistance, and they have been used as materials for cutting tools or high temperature mechanical parts. Most of the ceramics practically used are made of titanium boride, and zirconium boride is practically scarcely employed.

$ZrB_2$ composite sintered materials of the present invention have excellent characteristics such as a high melting point, high strength, high corrosion resistance, high hardness, electric conductivity and oxidation resistance, and they are useful in a wide range of applications, e.g. as materials for high temperature corrosion resistant parts, mechanical parts, heating elements, electrodes or crucibles of induction furnaces.

$ZrB_2$ composite sintered materials have not practically been used very much, but various materials have been proposed, for example, in patents.

Namely, as sintering additives or as secondary components in $ZrB_2$ sintered materials such as composite materials, there have been known a silicide such as $MoSi_2$, a nitride such as TaN, HfN or BN, an oxide such as $ZrO_2$, a carbide such as SiC or $B_4C$, or various metals.

For instance, with respect to the silicide, Japanese Examined Patent Publication No. 6098/1963 discloses $ZrSi_2$, and U.S. Pat. No. 3,705,112 discloses $MoSi_2$. However, these Si compounds are likely to melt or decompose when sintered in a high temperature atmosphere, and tend to lead to a porous micro-structure with extraordinary grain-growth, whereby the bending strength and corrosion resistance will be insufficient in many cases, and no adequate oxidation resistance for use in air will be obtained by the use of these secondary components only, although some anti-oxidation effects can be expected from the $SiO_2$ surface layer.

With respect to the nitride, TaN disclosed in U.S. Pat. No. 3,305,374 is incorporated to $ZrB_2$ or $TiB_2$ as highly hard material, and used for tool materials or decorative materials. Although being excellent with high hardness and high strength, such a material is not adequate in the oxidation resistance, thermal shock resistance or corrosion resistance when used in a high temperature oxidizing atmosphere as material for high temperature corrosion resistant parts, heating elements, electrodes, or crucibles for induction furnaces.

With respect to the carbide, U.S. Pat. No. 3,775,137 discloses SiC, and U.S. Pat. No. 3,325,300 discloses $B_4C$ and SiC. No adequate oxidation resistance is obtainable by the addition of SiC only as disclosed in U.S. Pat. No. 3,775,137. Whereas, when $MoSi_2+B_4C$ or $MoSi2 +SiC +B_4C$ are added as disclosed in U.S. Pat. No. 3,325,300, $MoSi_2$ has a melting point lower than the sintering temperature, and is likely to melt or decompose, or facilitate the grain-growth during the sintering, whereby the micro-structure tends to be porous, and the densification can hardly be accomplished, and no adequate oxidation resistance will be obtained.

With respect to the oxide, Japanese Examined Patent Publication No. 38048/1972 discloses a composite with $ZrO_2$. However, such a composite is intended to obtain high strength and high toughness by the transformation-toughness of the tetragonal $ZrO_2$. When it is used in a high temperature oxidizing atmosphere, the high strength and high toughness tend to be lost due to the transformation of the tetragonal $ZrO_2$ to the monoclinic form, and the oxidation resistance and heat shock resistance are not adequate.

Further, Japanese Unexamined Patent Publication No. 831/1972 and Japanese Examined Patent Publication No. 17502/1977 disclose that a sintered material comprising $TiB_2$ as the main component and hexagonal BN or AlN as the secondary component, or a sintered material comprising BN as the main component and $TiB_2$ or $ZrB_2$ as the secondary component, is useful particularly in a non-oxidizing atmosphere for molten metal crucibles or vacuum evaporation heaters. However, with such a mixture containing hardly sinterable BN as in the above instances, it is hardly possible to attain adequate densification or oxidation resistance, and the resulting product will be unsuitable for use in air.

Thus, $ZrB_2$ composite materials have not been practically used except for a very limited area, in spite of their excellent properties.

The present inventors have conducted extensive researches to overcome such problems with respect to the conventional $ZrB_2$ composite materials, and as a result, have succeeded in developing a sintered material which satisfies the requirements for various properties such as high density, high strength, oxidation resistance, corrosion resistance and thermal shock resistance, wherein some of the properties have been substantially improved.

Namely, the present invention provides a $ZrB_2$ composite sintered material consisting essentially of at least 1% by weight of SiC, at least 1% by weight of BN, at most 20% by weight of AlN, at most 20% by weight of $B_4C$, the rest being substantially $ZrB_2$, provided that the total amount of SiC and BN is from 2 to 50% by weight.

Basically, the present invention presents a $ZrB_2$ composite sintered material which contains at least 1% by weight of each of SiC (silicon carbide) and BN (boron nitride) as the secondary components, the total amount thereof being from 2 to 50% by weight, and the rest being substantially or mostly $ZrB_2$.

Now, the present invention will be described in detail with reference to the preferred embodiments.

In a first preferred embodiment, the total amount of SiC and BN is from 5 to 45% by weight. In the total amount of SiC and BN, SiC constitutes from 5 to 50% by weight, whereas BN constitutes from 95 to 50% by weight.

In a second preferred embodiment, the sintered material contains from 1 to 15% by weight of SiC, from 3 to 25% by weight of BN, and from 5 to 20% by weight of $B_4C$ (boron carbide). In this embodiment, the total amount of SiC, BN and $B_4C$ is particularly preferably within a range of from 15 to 50% by weight.

In another preferred embodiment, the sintered material contains from 1 to 15% by weight of SiC, from 3 to 25% by weight of BN and from 3 to 20% by weight of AlN (aluminum nitride). In this embodiment, the total amount of SiC, BN and AlN is particularly preferably within a range of from 15 to 50% by weight.

In a further preferred embodiment, the sintered material contains from 3 to 15% by weight of SiC.

$ZrB_2$ to be used in the present invention can be obtained, for example, by reacting a mixture of zirconium oxide, boron oxide and carbon at a high temperature. For the production of the sintered material of the present invention, it is desirable to employ the one having a purity as high as possible. Likewise, the particle size of the powder is preferably as small as possible. Specifically, the purity is preferably at least 99%, and the mean particle size is preferably at most 10 μm, more preferably at most 5 μm.

With respect to SiC, BN, B$_4$C and AlN which are present as secondary components, it is required only that the respective specified amounts be present in the sintered material. Therefore, they may be incorporated in any forms as the starting materials. However, when starting materials other than in the form of SiC, BN, B$_4$C and AlN are used, special care is required for the sintering step. Therefore, it is expedient to prepare the starting materials in the form of SiC, BN, B$_4$C and AlN. Starting materials such as SiC, BN, B$_4$C and AlN are also preferably as pure as possible, and usually preferably have a purity of at least 99%.

The starting material mixture is prepared usually by uniformly mixing fine powders of the three or four starting materials and the same will apply when ultra fine pulverization is employed for the purpose of pulverization and mixing. Generally, the particle size of the starting material mixture is preferably at most 10 μm, and more preferably, the mixture is adequately prepared to have a mean particle size of at most 1 μm.

The sintered material of the present invention is obtainable either by filling the mixture of the starting materials in a mold of e.g. graphite and subjecting it to pressure-less sintering or hot pressing in vacuum or in an inert or reducing atmospehre such as argon, helium or carbon monoxide, or by molding the above mixture by a rubber press mold, followed by pressure-less sintering.

The hot pressing is suitably conducted under a pressure of from 50 to 2000 kg/cm$^2$.

The sintering temperature may vary depending upon e.g. the types and proportions of the secondary components, but is usually from 1600° to 2300° C. The sintering time is usually from 0.5 to 5 hours.

Further, the sintering temperature is preferably from 1700° to 2200° C. when B$_4$C is incorporated as a secondary component, and from 1800° to 2300° C. when AlN is incorporated as a secondary component.

The proportion of the secondary components in the sintered material of the present invention is from 2 to 50% by weight, and the rest is substantially ZrB$_2$ as the main component. However, this main component ZrB$_2$ may partially be replaced by other component such as TiB$_2$ in a small amount not to impair the characteristics of ZrB$_2$.

BN and SiC as secondary components are required to be at least 1% by weight, respectively. If BN is less than 1% by weight, the required properties such as the thermal shock resistance, oxidation resistance and high corrosion resistance can not adequately be attained. On the other hand, if SiC is less than 1% by weight, the oxidation resistance will be inadequate, and it will be difficult to attain desired densification. SiC is preferably from 1 to 15% by weight, more preferably from 3 to 15% by weight, and BN is preferably from 3 to 25% by weight.

It is not clearly understood why the presence of SiC brings about the improvement of the oxidation resistance of the sintered material of the present invention. However, it is considered that such an improvment is attributable to the formation of a highly viscous B$_2$O$_3$-SiO$_2$ surface layer during the use. This indicates that the sintered material of the present invention is adequately durable for use as heating elements.

In such an application as a heating element, it is advantageous that the electrical resistivity can be varied. In this respect, the sintered material of the present invention is very advantageous since BN which functions as an insulating component is used together with SiC.

While each of BN and SiC may be present in an amount about a half of the sintered material, if BN exceeds 50% by weight, it becomes difficult to conduct sintering and to obtain a high density product, and if SiC exceeds 50% by weight, the thermal shock resistance tends to be hardly obtainable, and in each case, the desirable properties of ZrB$_2$ will be impaired. Therefore, the total amount of BN and SiC should be not more than 50% by weight. Within this range, the preferred range of the total amount of SiC and BN is from 5 to 45% by weight. With respect to the proportions of SiC and BN, in the total amount of the two materials, SiC preferably constitutes from 5 to 50% by weight, and BN preferably constitutes from 95 to 50% by weight.

Further, other secondary components may be incorporated to such an extent not to substantially impair the object and effects of the sintered material of the present invention. However, it is desirable to minimize the amounts of such other components including unavoidable impurities.

However, there are some secondary components, which are preferably be incorporated. Typical examples of such desirable secondary components are B$_4$C and AlN.

In the case of B$_4$C, it is incorporated in an amount of at least 5% by weight. If the amount of B$_4$C is less than 5% by weight, no adequate effect for densification is obtainable. On the other hand, the maximum amount should be 20% by weight, since if the amount is excessive, the heat resistance tends to decrease. The amount is preferably from 7 to 15% by weight. In this case, BN is required to be at least 3% by weight. If BN is less than 3% by weight, no adequate effects for the thermal shock resistance and corrosion resistance will be obtained. On the other hand, the maximum amount should be 25% by weight, since if the amount is excessive, it becomes difficult to conduct sintering and to obtain a high density product. The amount of BN is preferably from 5 to 20% by weight.

The total amount of SiC, B$_4$C and BN is at least 9% by weight, and at most 60% by weight. However, if the total amount is excessive, the desirable characteristics of ZrB$_2$ tend to be impaired. Accordingly, the total amount is usually within a range of from 15 to 50% by weight.

In the case where AlN is incorporated, it is used in an amount of at least 3% by weight. If the amount is less than 3%, no adequate effect for densification is obtainable. On the other hand, the maximum amount should be 20% by weight, since if the amount is excessive, the heat resistance tends to decrease or the oxidation resistance tends to decrease. The amount is preferably from 7 to 15% by weight. In this case, BN is incorporated in an amount of at least 3% by weight. If the amount is less than 3% by weight, no adequate effects for the thermal shock resistance and corrosion resistance tend to be obtained. On the other hand, the maximum amount should be 25% by weight, since the if the amount is excessive, it becomes difficult to conduct sintering and to obtain a high density product. The amount is preferably from 5 to 20% by weight.

Further, the total amount of SiC and AlN is at least 9% and at most 60%. However, if the total amount is excessive, the desirable characteristics of $ZrB_2$ tend to be impaired. Therefore, the total amount is usually from 15 to 50% by weight.

The sintered material of the present invention has a dense structure in which $ZrB_2$ fine crystal grains having a mean grain size of a few micro meters (most of the grains being not larger than 10 $\mu$m, and many grains being not larger than 5 $\mu$m) are uniformly dispersed, and the secondary components such as SiC, BN, $B_4C$ and AlN are uniformly distributed around or between the ZrB crystal grains.

Further, in the structure of the system wherein at least 15% by weight of BN is present, BN having lubricating properties has a sheet-like structure having a width of a few micro meters and a length of about 8 $\mu$m, and is present around the $ZrB_2$ fine crystal grains i.e. the main component. Other secondary components i.e. $B_4C$, SiC and AlN are uniformly distributed between the $ZrB_2$ crystal grains in the form of substantially spherical fine grains (most of the grains being not larger than 5 $\mu$m).

The sintered material of the present invention is a highly dense sintered material having a high density and excellent oxidation resistance, thermal shock resistance, high strength and corrosion resistance, and electric conductivity, which is most suitable for high temperature corrosion resistant parts, heating elements or crucibles which are used in air, and which is useful also for other mechanical part materials or tools. Thus, it is useful for various applications wherein the desirable characteristics of the $ZrB_2$ sintered material are utilized. Thus, the practical value of the present invention is significant.

Now, the present invention will be described in further detail with reference to Examples. However, it should be understood that the present invention is by no means restricted to these specific Examples.

In the examples, "%" means "% by weight", and "parts" means "parts by weight".

EXAMPLE 1

In order to adequately pulverize and mix 85 parts of $ZrB_2$ powder (purity: at least 99%), 10 parts of hexagonal BN powder and 5 parts of SiC powder, the mixture was pulverized and mixed for three days by means of a pot mill and by using ethanol solvent and SiC balls. The powder thereby obtained was, after the removal of the alcohol by an evaporator, sufficiently dried to obtain a powder having a mean particle size of 0.15 $\mu$m. This powder was filled in a graphite mold and heated at 2000° C. under a pressure of 350 kg/cm$^2$ for 30 minutes in an argon atmosphere, to obtain a sintered material.

The sintered material thus obtained had a relative density of 98%, a bending strength of 45 kg/mm$^2$, no change in the oxidation resistance (Note 1) and a thermal shock resistance (Note 2) of $\Delta T = 700°$ C.

EXAMPLES 2 to 5 and 9 to 11 and COMPARATIVE EXAMPLES 1 and 2

Sintered materials were prepared in the same manner as in Example 1 except for the conditions identified in Table 1. The properties of the sintered materials are shown in Table 1.

EXAMPLES 6 to 8

Sintered materials were prepared in the same manner as in Example 1 except that the powder mixtures were molded under 2000 kg/cm$^2$ by rubber pressing, followed by pressure-less sintering at 2100° C. for 1 hour in an argon atmosphere. The properties of the sintered materials are shown in Table 1.

(The weight ratio of SiC in the sintered material in each Example is greater by about 2% than the weight ratio in the mixture of the starting materials, since certain SiC from the SiC balls was included. In Comparative Example 1, there was no such inclusion of SiC, since the mixing was conducted in a dry system without using SiC balls.)

TABLE 1

|  | Amounts of starting materials (parts by weight)* | | Sintering conditions | | Properties of sintered material | | | |
| --- | --- | --- | --- | --- | --- | --- | --- | --- |
|  | BN | SiC | Temp. (°C.) | Pressure (kg/cm$^2$) | Density (g/c.c.) | Bending strength kg/mm$^2$) | Oxidation resistance (Note 1) | Thermal shock resistance (Note 2) |
| Example 2 | 5 | 5 | 2000 | 350 | 98 | 63 | No change | 400 |
| Example 3 | 30 | 10 | 2000 | 350 | 95 | 35 | " | 1000 |
| Example 4 | 10 | 10 | 2000 | 350 | 97 | 48 | " | 600 |
| Example 5 | 20 | 20 | 2000 | 350 | 97 | 41 | " | 800 |
| Example 6 | 5 | 5 | 2100 | Pressure-less | 95 | 41 | " | 500 |
| Example 7 | 10 | 5 | 2100 | " | 93 | 32 | " | 800 |
| Example 8 | 20 | 10 | 2100 | " | 90 | 25 | " | 900 |
| Example 9 | 20 | 2 | 2000 | 350 | 95 | 20 | " | 850 |
| Example 10 | 2 | 10 | 2000 | 350 | 97 | 50 | " | 300 |
| Example 11 | 35 | 12 | 2000 | 350 | 92 | 18 | " | 1000 |
| Comparative Example 1 | 10 | 0 | 2000 | 350 | 90 | 25 | Oxidized and whitened | 500 |
| Comparative Example 2 | 0 | 10 | 2000 | 350 | 98 | 65 | Oxidized and slightly whitened | 250 |

*The rest (to make up the total of 100 parts by weight) being $ZrB_2$ and unavoidable impurities.
Note 1:
The oxidation resistance is represented by the outer appearance after the sintered material was held at 1300° C. for 12 hours in the oxidizing atmosphere in an electric furnace.
Note 2:
The thermal shock resistance was determined by measuring the bending strength of the sample when the sample was heated at a temperature for 1 minute in an electric furnace and rapidly cooled in water, and the thermal shock resistance was represented by the treating temperature (°C.) of the sample at which the strength was abruptly dropped.

EXAMPLE 12

In order to adequately pulverize and mix $ZrB_2$ powder (purity: at least 99%), $B_4C$ powder (purity: at least 99%), BN powder (purity: at least 99%) and SiC powder (purity: at least 99%), the mixture was pulverized and mixed for 3 days by means of a pot mill and by using ethanol solvent and SiC balls. The powder thereby obtained was, after the removal of the alcohol by an evaporator, sufficiently dried to obtain a powder having a mean particle size of 0.15 μm. This powder was molded under 2000 kg/cm² by means of a rubber press, and then subjected to pressure-less sintering at 2300° C. for 2 hours in an argon atmosphere. The properties of the sintered material thus obtained are shown in Table 2.

EXAMPLE 14

The same $ZrB_2$ powder, SiC powder, $B_4C$ powder and BN powder as used in Example 12 were pulverized and mixed for 3 days by means of a pot mill and by using ethanol solvent and SiC balls.

The powder thus obtained was, after the removal of the alcohol by an evaporator, sufficiently dried to obtain a powder having a mean particle size of 0.15 μm. This powder was filled in a graphite mold, and heated at 2050° C. for 30 minutes under a pressure of 350 kg/cm² in an argon atmosphere.

The properties of the sintered material thus obtained are shown in Table 2.

EXAMPLES 13 and 15 to 17 and Comparative Example 3 to 7

The predetermined mixtures of starting materials were prepared in accordance with Examples 12 and 14, and treated under the predetermined sintering conditions, to obtain the respective sintered materials. The results are shown in Table 2.

EXAMPLE 18

In order to adequately pulverize and mix $ZrB_2$ powder (purity: at least 99%), AlN powder (purity: at least 99%), BN powder (purity: at least 99%) and SiC powder (purity: at least 99%), the mixture was pulverized and mixed for 3 days by means of a pot mill and by using ethanol solvent and SiC balls. The powder thereby obtained was, after the removal of the alcohol by an evaporator, sufficiently dried to obtain a powder having a mean particle size of 0.15 μm. This powder was molded under 2000 kg/cm² by means of a rubber press, and then subjected to pressure-less sintering at 2200° C. for 2 hours in an argon atmosphere. The properties of the sintered material thus obtained are shown in Table 3.

EXAMPLE 20

The same $ZrB_2$ powder, SiC powder, AlN powder and BN powder as used in Example 18 were pulverized and mixed for 3 days by means of a pot mill and by using ethanol solvent and SiC balls.

The powder thereby obtained was, after the removal of the alcohol by an evaporator, sufficiently dried to obtain a powder having a mean particle size of 0.15 μm. This powder was filled in a graphite mold, and heated at 2050° C. for 30 minutes under a pressure of 350 kg/cm² in an argon atmosphere. The properties of the sintered material thus obtained are shown in Table 3.

EXAMPLES 19 and 21 to 23 and COMPARATIVE EXAMPLES 8 to 11

The predetermined mixtures were prepared in accordance with Examples 18 and 20, and treated under the predetermined sintering conditions to obtain sintered materials. The results are shown in Table 3.

The oxidation resistance and the thermal shock resistance were measured by the same methods as indicated with respect to Table 2.

We claim:

1. A $ZrB_2$ composite sintered material consisting essentially of components (a) from 1 to 15% by weight of SiC, (b) from 3 to 25% by weight of BN, and (c) from 3 to 20% by weight of AlN or from 5 to 20% by weight of $B_4C$, the rest being substanstantially $ZrB_2$, provided that the total amount of SiC and BN is from 4 to 40% by weight.

TABLE 2

| | Sintering conditions | | Properties of sintered material | | | | | |
|---|---|---|---|---|---|---|---|---|
| | Temp. (°C.) | Pressure (kg/cm²) | Analytical values* (% by weight) | | | Relative density (%) | Bending strength (kg/mm²) | Oxidation resistance (Note 1) | Thermal shock resistance (Note 2) |
| | | | BN | $B_4C$ | SiC | | | | |
| Example 12 | 2300 | Pressure-less | 10 | 10 | 5 | 94 | 37 | No change | 800 |
| Example 13 | 2200 | " | 5 | 15 | 5 | 96 | 51 | " | 500 |
| Example 14 | 2050 | 350 | 20 | 10 | 5 | 98 | 50 | " | 1000 |
| Example 15 | 2000 | 350 | 10 | 10 | 10 | 99 | 63 | " | 800 |
| Example 16 | 2000 | 350 | 20 | 5 | 15 | 98 | 53 | " | 900 |
| Example 17 | 1900 | 350 | 4 | 7 | 10 | 98 | 68 | " | 600 |
| Comparative Example 3 | 1900 | 350 | 0 | 10 | 5 | 95 | 51 | " | 300 |
| Comparative Example 4 | 2050 | 350 | 10 | 10 | 0 | 94 | 29 | Oxidized and decomposed | 550 |
| Comparative Example 5 | 2000 | 350 | 30 | 10 | 5 | 92 | 22 | No change | 800 |
| Comparative Example 6 | 1900 | 350 | 10 | 30 | 5 | 97 | 43 | " | 400 |
| Comparative Example 7 | 2200 | Pressure-less | 10 | 10 | 20 | 91 | 36 | " | 450 |

*The rest (to make up the total of 100% by weight) being $ZrB_2$ and unavoidable impurities.
Note 1:
The oxidation resistance is represented by the weight increase (the increase (mg) per unit surface area (cm²)) when the sintered material was held at 1000° C. for 12 hours in an oxidizing atmosphere.
Note 2:
The thermal shock resistance was determined by measuring the bending strength of the sample when the sample was rapidly heated at a temperature for 2 minutes in an electric furnace and then rapidly cooled in water, and the thermal shock resistance was represented by the the treating temperature (°C.) of the sample at which the strength was abruptly dropped.

TABLE 3

| | Sintering conditions | | Analytical values* (% by weight) | | | Properties of sintered material | | | |
| --- | --- | --- | --- | --- | --- | --- | --- | --- | --- |
| | Temp. (°C.) | Pressure (kg/cm$^2$) | BN | AlN | SiC | Relative density (%) | Bending strength (kg/mm$^2$) | Thermal shock resistance (°C.) | Oxidation resistance |
| Example 18 | 2200 | Pressure-less | 10 | 10 | 5 | 93 | 38 | 850 | No change |
| Example 19 | 2200 | " | 5 | 15 | 5 | 95 | 49 | 600 | " |
| Example 20 | 2050 | 350 | 20 | 10 | 5 | 98 | 52 | 1000 | " |
| Example 21 | 2000 | 350 | 10 | 10 | 10 | 98 | 60 | 800 | " |
| Example 22 | 2000 | 350 | 22 | 5 | 13 | 97 | 48 | 1000 | " |
| Example 23 | 1950 | 350 | 4 | 7 | 9 | 98 | 72 | 700 | " |
| Comparative Example 8 | 1900 | 350 | 0 | 10 | 5 | 94 | 41 | 300 | " |
| Comparative Example 9 | 2000 | 350 | 10 | 10 | 0 | 93 | 30 | 500 | Oxidized and decomposed |
| Comparative Example 10 | 2050 | 350 | 30 | 10 | 5 | 92 | 27 | 800 | No change |
| Comparative Example 11 | 1900 | 350 | 10 | 30 | 5 | 96 | 42 | 450 | Oxidized and decomposed |

*The rest (to make up the total of 100% by weight) being ZrB and unavoidable impurities.

2. The sintered material according to claim 1, wherein SiC is from 3 to 15% by weight.

3. The sintered material according to claim 1, wherein the total amount of SiC and BN is from 5 to 40% by weight.

4. The sintered material according to claim 1, wherein in the total amount of SiC and BN, SiC constitutes from 5 to 50% by weight, and BN constitutes from 95 to 50% by weight.

5. The sintered material according to claim 1, wherein component (c) is B$_4$C.

6. The sintered material according to claim 5, wherein the total amount of SiC, BN and B$_4$C is from 15 to 50% by weight.

7. The sintered material according to claim 1, wherein component (c) is AlN.

8. The sintered material according to claim 7, wherein the total amount of SiC, BN and AlN is from 15 to 50% by weight.

* * * * *